Figure 1:
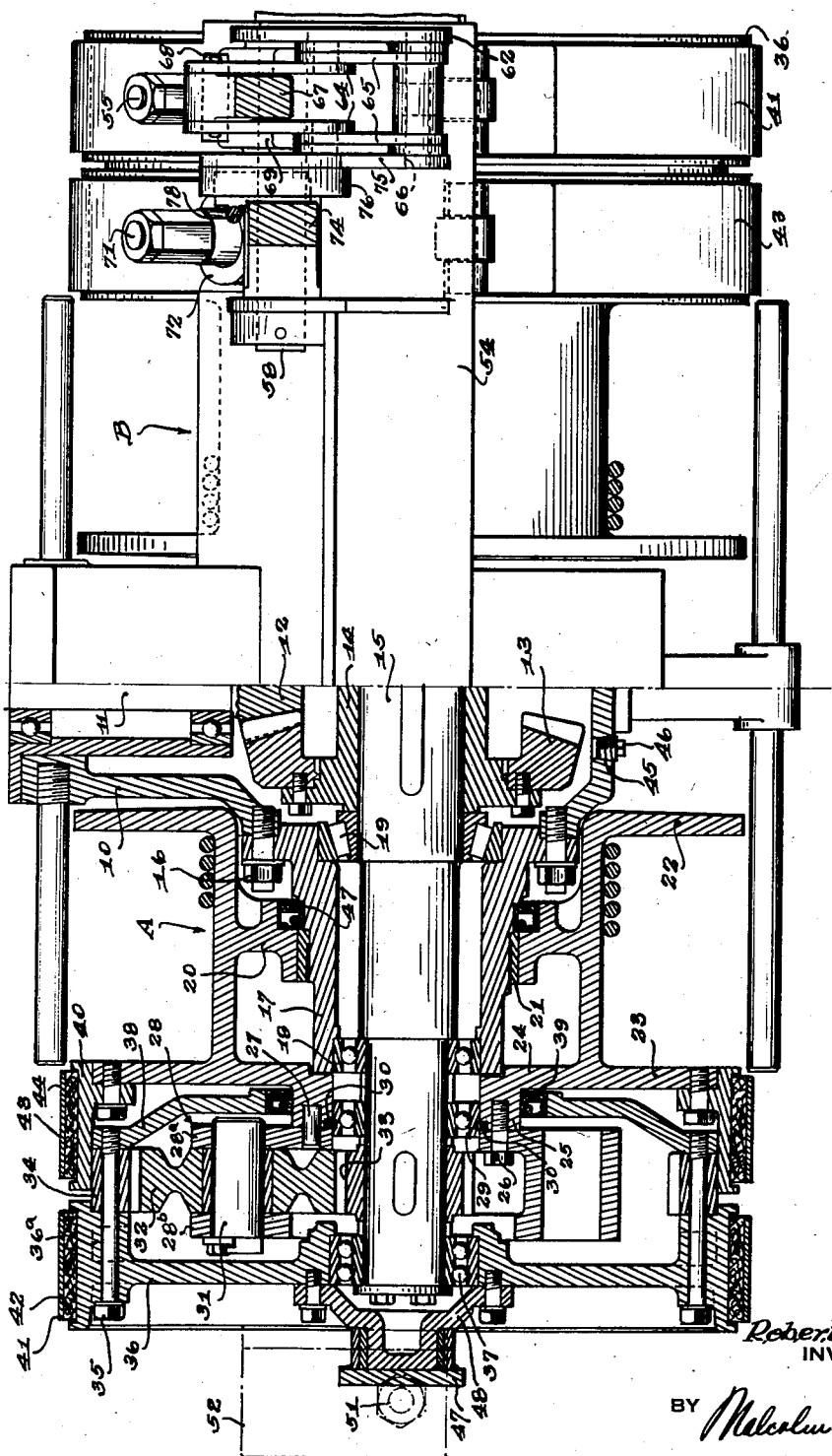

March 7, 1944.  R. B. MAGEE  2,343,465
POWER CONTROL UNIT
Filed Nov. 24, 1941  2 Sheets-Sheet 1

Robert B. Magee
INVENTOR

BY Malcolm W. Fraser
ATTORNEY

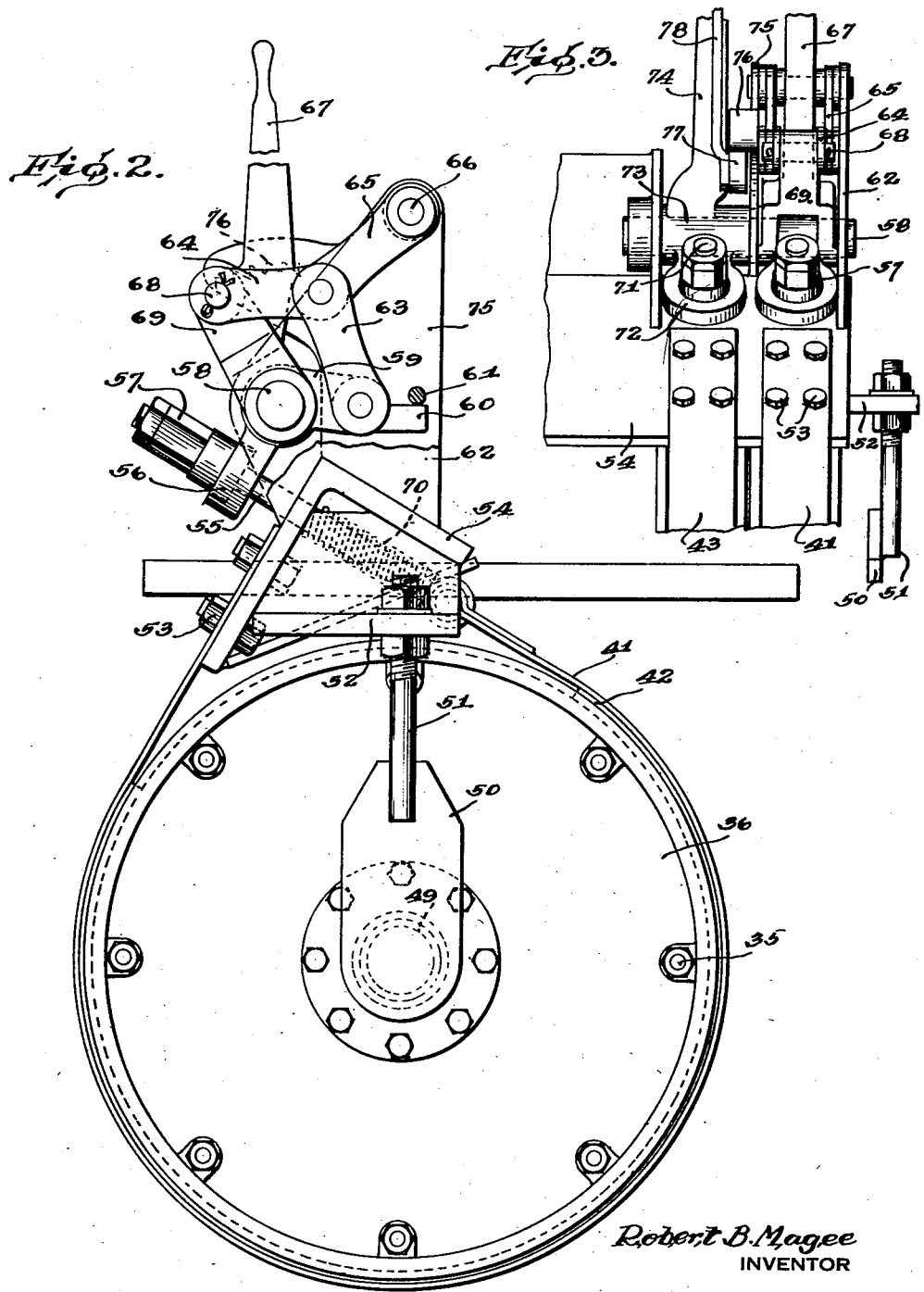

Patented Mar. 7, 1944

2,343,465

UNITED STATES PATENT OFFICE 2,343,465

POWER CONTROL UNIT

Robert B. Magee, Findlay, Ohio, assignor to The Buckeye Traction Ditcher Company, Findlay, Ohio, a corporation of Ohio Application November 24, 1941, Serial No. 420,174

6 Claims. (Cl. 254—187)

This invention relates to power units of the type adapted to be mounted on a tractor and controlled by the tractor operator for the purpose of operating various features of an implement connected to or hauled by the tractor.

An object of this invention is to improve the construction and operation of a power unit of the planetary type in which clutch and brake bands are employed for controlling the operation of the cable drum in such manner that its efficiency is increased.

Another object is to produce a power unit of the above character in which greater power for driving the cable drum is employed and at the same time reducing the amount of effort required for effectively applying friction to the clutch band.

Another object is to improve the lubricating system of such power unit enabling the major portion of lubrication to be accomplished at one location.

A further object is to reduce end play or endwise movement of the cable drum and planetary gear carrier thereby reducing friction and enhancing the life of the parts.

A still further object is to obviate or materially reduce the strain ordinarily imposed on the free end portion of the driving shaft during the application of the clutch band.

Other objects and advantages will hereinafter appear and for purposes of illustration but not of limitation, an embodiment of the invention is shown by way of illustration on the accompanying drawings, in which Figure 1 is a view partly in side elevation and partly in longitudinal section of a power control unit;

Figure 2 is an end elevation of the unit showing particularly the operating lever arrangement; and Figure 3 is a fragmentary front side elevation of the operating levers and the mounting therefor.

The illustrated embodiment of the invention comprises a power unit of the planetary gear type which is adapted to be mounted on a tractor and controlled by the tractor operator for use in operating or controlling the operation of implements such as bulldozers, trailbuilders, scrapers, etc. As shown, the power unit or winch comprises a main gear housing 10 which is adapted to be bolted or otherwise suitably secured to the tractor frame and extending into the housing 10 and suitably journaled therein is a power take-off shaft 11 which may be connected in any suitable manner to be driven by the tractor engine. On the inner end of the shaft 11 is a bevel gear 12 which meshes with a gear 13 which is bolted to a flanged sleeve 14. The sleeve 14 is suitably keyed to the drive shaft 15 which extends at substantially right angles to the power take-off shaft 11. Concentric with the drive shaft 15 are cable drums A and B which, as will hereinafter appear, are connected to be driven from the drive shaft 15. Since the mechanism is the same on each side of the power take-off shaft 11, description of the structure and operation on one side is deemed sufficient.

Secured by a series of bolts 16 to one side of the gear housing 10 is a housing extension 17 and interposed between the extension 17 and the drive shaft 15 is a ball bearing unit 18 on one side and a thrust roller bearing 19 on the opposite side. Integral with the inner side of the cable drum A and disposed centrally thereof is a collar 20 which rotates with a bushing 21 fixed to the cable drum A. The bushing 21 rotatably engages the housing extension 17.

It will be observed that an integral flange 22 forms a closure for one side of the drum A and a flange 23 forms a closure for the opposite side, the latter having an inner extension 24 provided with a lateral projection 25 which is concentric with the drive shaft 15. The projection 25 is secured by a series of bolts 26 and dowel pins 27 to a planetary gear carrier 28 which is likewise disposed concentrically of the drive shaft 15. Secured to both the annular projection 25 and the planetary gear carrier 28 is a ball bearing unit 29 enabling these parts to rotate relative to the drive shaft 15. Fitting within an annular recess in the outer race of the ball bearing unit 29 and in a recess in the annular projection 25 and abutting against the outer adjacent face of the planetary gear carrier 28 is a split ring 30. It will be understood that a suitable means is provided for holding the ball bearing unit 29 on the shaft 15 against axial shifting movements as, for example, through the medium of a press fit between the inner ball race and the shaft. The split ring 30 militates against endwise movement of the cable drum A and gear carrier 28 and receives the thrust of the cable pull imposed upon the cable drum A and the gears, transmitting such thrust to the ball bearing unit 29.

As shown, the planetary gear carrier consists of laterally spaced plates 28a and 28b, suitably apertured to receive bearing pins 31 on which are journaled respectively a series of planet gears 32 (only one planet gear 32 being shown on Figure 1). The planet gears 32 mesh with gear 33 which is fixed for rotation to the drive shaft 15.

Concentric with the drive shaft 15 is a ring gear 34 with which each of the planet gears 32 mesh. The ring gear is secured by bolts 35 to a clutch drum 36 which is concentric with the drive shaft 15, a ball bearing unit 37 being interposed between the drum 36 and the shaft. From the above description it will be apparent that by holding the clutch drum 36 stationary, the drive shaft 15 will drive the cable drum A through the planet gears and the planet gear carrier 28 as will be readily understood. An important advantage exists in driving the cable drum A through the planet gears instead of through the ring gear 34 because the present construction affords a greater gear reduction and consequently greater power is imparted to the cable drum with the employment of a reduced amount of brakeage to hold the clutch drum 36 against rotation. In case that the drive is through the ring gear 34, a much greater force is required to hold the clutch drum 36 to obtain as great power through the cable drum as in the present construction.

Disposed on the inner side of the planet gear carrier 28 and abutting against the inner side of the ring gear 34 is a plate 38 which is rigid with the ring gear and the clutch drum 36, the bolts 35 extending through the ring gear and engaging the outer edge portion of the plate 38. The plate 38 which is in the form of a disc has the edge of its opening spaced from the outer side of the annular projection 25 and interposed between the projection and the plate 38 is an oil seal 39 of any well-known construction which has wiping contact with the annular projection 25 to prevent the escape of lubrication from the planet gears and associated parts. It will be apparent that an oil reservoir is formed in this manner, the clutch drum 36 providing one side and the plate 38 the opposite side and the ends being closed by an extension 36a of the clutch drum and the ring gear 34.

Overlapping a portion of the ring gear 34 is a brake drum 40 which is bolted to the side 23 of the cable drum A. Engaging the braking surface of the clutch drum 36 is a brake band 41 having a lining 42 and engageable with the brake drum 40 is a brake band 43 having a lining 44. The mechanism for operating the brake bands 41 and 43 will be hereinafter described.

Formed in the gear housing 10 is an oil inlet opening 45 closed by a plug 46. An important advantage of this construction is that oil introduced through the opening 45 is sufficient to lubricate the main drive gears, the drive shaft bearings, the planetary gear arrangement and the cable drum bearing. An oil seal 47 interposed between the cable drum collar 20 and the housing extension 17 prevents loss of lubrication between the cable drum and the housing extension. In this manner it will be apparent that a single means is provided for lubricating practically all of the working parts of the winch thereby greatly facilitating the lubrication of the machine and providing substantially a foolproof structure from the standpoint of lubrication.

In order to relieve the strain normally imposed upon the end portion of the drive shaft 15 during the application of the brake bands particularly the clutch band 41, an outboard bearing 48 is provided. In this instance, the bearing member 48 is bolted to the clutch drum 36 although if desired, it could be fixed to the drive shaft 15. The bearing member 48 rotates in a bearing cup 49 which is carried by a bracket 50 secured by a bolt 51 to a cross beam 52 which is a rigid member fixed to a stationary frame part of the machine such, for example, as an extension of the gear housing 10. It will be apparent that any strain normally imposed upon the end portion of the drive shaft 15 will be transmitted to the outboard bearing thus militating against breakage of the drive shaft due to such strains.

It will be manifest from the above description that upon applying the clutch band 41, the clutch drum 36 may be retarded or held stationary thereby causing rotation of the cable drum A at the desired speed. However, when it is desired to hold the cable drum A against rotation, the brake band 43 is applied and the clutch band 41 is released. For operating the clutch band 41 and brake band 42, manual levers are employed. The clutch band 41 is fixed by bolt and nut assemblies 53 to an angle bracket 54 rigid with the frame. The opposite end of the band 41 is pivotally connected to a rod 55 which extends through an opening in an arm 56, nuts 57 on the bolt 55 engaging the outer side of the arm 56. The arm 56 provides one arm of the bell crank which is pivotally mounted on a pin 58. The other arm of the bell crank 59 has an extension 60 which is adapted to abut against a stop pin 61 which is fast to a stationary bracket 62. Pivoted to the bell crank arm 59 is an arm 63 which is pivoted with an arm 64. At the juncture of the arms 63 and 64, is pivoted a link 65 the opposite end of which swings about a pin 66 carried by the bracket 62. The clutch operating lever 67 is connected by a pin 68 to the arm 64 and the lower end of the operating arm 67 is formed with a yoke 69 which straddles the bell crank 59 and is pivoted on the pin 58. From the above description it will be apparent that upon movement of the arm 67 in one direction, the clutch band 41 is drawn tightly about the clutch drum 36 and when the arm is released, a coil spring 70 automatically releases the clutch band, as will be readily understood.

The brake band 43 is similarly secured to the angle bracket 54 and the opposite end has a rod 71 similarly connected to the free end of the band. The rod 71 extends through an actuating arm 72 for moving the rod 71 for applying a brake band. The arm 72 is integral with a hub portion 73 which is rotatable upon the pin 58 and integral with the hub portion 73 is an actuating lever 74. Carried by the frame and spaced from the bracket 62 is a bracket plate 75 which carries a ratchet sector 76 engageable by a pawl 77 for holding the brake lever 74 in adjusted position. The pawl 77 is pivoted to the arm 74 and has the usual spring tensioned actuating rod 78. Obviously upon release of the pawl 77, the arm 74 may be moved to desired position for applying the brake to the brake drum 40 in the usual manner.

As above indicated, the clutch and brake band operating mechanism associated with the cable drum B is similar to that above described so that more detailed description is not considered necessary, it being observed in Figure 1 that the reference numerals designating the clutch and brake band operating parts have been applied to the right hand portion of the figure for convenience in illustration.

It is to be understood that numerous changes in details of construction, arrangement and operation may be effected as do not depart from the spirit of the invention especially as defined in the appended claims.

What I claim is:

1. Hoist mechanism comprising an operating shaft, a cable drum mounted for rotation about said shaft, a band actuated brake drum secured to one side of said cable drum, a band actuated clutch drum contiguous to and spaced axially from said brake drum and mounted for relative rotation about said shaft, a ring gear abutting against the inner side of said clutch drum, a plate abutting against the opposite side of said ring gear and cooperating with said clutch drum to provide a planetary gear transmission housing, a lateral projection on said cable drum, an oil seal between said plate and said lateral projection, a planetary gear carrier secured to said annular projection and disposed in said housing, an anti-friction bearing interposed between said projection and said shaft, and a split ring cooperating with said anti-friction bearing and projection for preventing endwise movement of the cable drum and gear carrier.

2. Hoist mechanism comprising an operating shaft, a cable drum mounted for rotation about said shaft, a band actuated brake drum secured to one side of said cable drum, a band actuated clutch drum contiguous to and spaced slightly from said brake drum and mounted for relative rotation about said shaft, a ring gear on the inner face of said clutch drum and bridging the space between said clutch and brake drums, means for securing said ring gear to the clutch drum for rotation therewith, a plate between said cable drum and ring gear and secured at its outer peripheral portion to the latter for rotation therewith, a gear carrier, means including a series of bolts and an axially extending portion providing a fixed connection between said cable drum and said gear carrier, thereby enabling said gear carrier to rotate with said cable drum, an oil seal between the inner free edge portion of said plate and said axially extending portion, planet gears on said gear carrier meshing with said ring gear, an anti-friction bearing between said axially extending portion and said operating shaft, and a drive gear on said operating shaft meshing with said planet gears, said clutch drum, ring gear, plate and axially extending portion cooperating to provide a lubricant containing housing for the gears.

3. Hoist mechanism as claimed in claim 2 in which the axially extending portion comprises an integral axial extension on the cable drum abutting flatwise against said gear carrier, and said series of bolts securing said gear carrier to said extension.

4. Hoist mechanism comprising an operating shaft, a cable drum mounted for rotation about said shaft, a band actuated brake drum secured to one side of said cable drum, a band actuated clutch drum contiguous to and spaced slightly from said brake drum and mounted for relative rotation about said shaft, a ring gear on the inner face of said clutch drum and bridging the space between said clutch and brake drums, means for securing said ring gear to the clutch drum for rotation therewith, a plate between said cable drum and ring gear and secured at its peripheral portion to the latter for rotation therewith, a gear carrier, an intergal axial extension on said cable drum abutting flatwise against the side of said gear carrier, a series of bolts securing said carrier and extension for conjoint rotation, an anti-friction bearing between both said carrier, drum projection and said operating shaft, the other side of said carrier being free of said operating shaft, an oil seal between the inner free edge portion of said plate and the outer peripheral surface of said drum extension, and a drive gear on said operating shaft meshing with said planet gears, said clutch drum, ring gear, plate and axially extending portion cooperating to provide a lubricant containing housing for the gears.

5. Hoist mechanism comprising a drive gear case having a lubricant receiving opening, a tubular extension on one side of said gear case, an operating shaft extending through said gear case and said tubular extension and spaced from the inner walls of the latter, anti-friction bearing means interposed between said operating shaft and tubular extension, a cable drum mounted for rotation upon said tubular extension, an oil seal between said cable drum and said tubular extension, a band actuated brake drum secured to one side of said cable drum for rotation therewith, a band actuated clutch drum contiguous to and spaced slightly from said brake drum and mounted for relative rotation about said shaft, an anti-friction bearing interposed between said clutch drum and said operating shaft, said clutch drum being disposed adjacent the free end portion of said operating shaft, a cap on said clutch drum forming a closure for the free end of said operating shaft, a ring gear on the inner face of said clutch drum and bridging the space between said clutch and brake drums, means for securing said ring gear to the clutch drum for rotation therewith, a plate between said cable drum and ring gear and secured at its peripheral portion to the latter for rotation therewith, an axial extension on said cable drum adjacent said operating shaft, a gear carrier abutting flatwise against the free end of said axial extension, fasteners for securing said gear carrier to said axial extension, an oil seal between said plate and said axial extension, an anti-friction bearing common to said gear carrier and said axial projection and said operating shaft, planet gears on said gear carrier meshing with said ring gear, and a drive gear on said operating shaft meshing with said planet gears.

6. Hoist mechanism comprising a drive gear case having a lubricant receiving opening, a tubular extension on one side of said gear case, an operating shaft extending through said gear case and said tubular extension and spaced from the inner walls of the latter, anti-friction bearing means interposed between said operating shaft and tubular extension, a cable drum mounted for rotation upon said tubular extension, an oil seal between said cable drum and said tubular extension, a band actuated brake drum secured to one side of said cable drum for rotation therewith, a band actuated clutch drum contiguous to and spaced slightly from said brake drum and mounted for relative rotation about said shaft, an anti-friction bearing interposed between said clutch drum and said operating shaft, said clutch drum being disposed adjacent the free end portion of said operating shaft, a cap on said clutch drum forming a closure for the free end of said operating shaft, a ring gear on the inner face of said clutch drum and bridging the space between said clutch and brake drums, means for securing said ring gear to the clutch drum for rotation therewith, a plate between said cable drum and ring gear and secured at its peripheral portion to the latter for rotation therewith, an axial extension on said cable drum adjacent said operating shaft, a gear carrier abutting flatwise against the free end of said axial extension, fasteners for securing said gear carrier to said axial extension, an oil seal between said plate and said axial extension, an anti-friction bearing common to said gear carrier and said axial extension, and said operating shaft, means cooperating with said last anti-friction bearing for militating against endwise movement of said cable drum and gear carrier, planet gears on said gear carrier meshing with said ring gear, and a drive gear on said operating shaft meshing with said planet gears.

ROBERT B. MAGEE.